J. A. ANDERSON.
TANK FOR TREATING GARBAGE.
APPLICATION FILED MAR. 8, 1916.
1,214,113.
Patented Jan. 30, 1917.
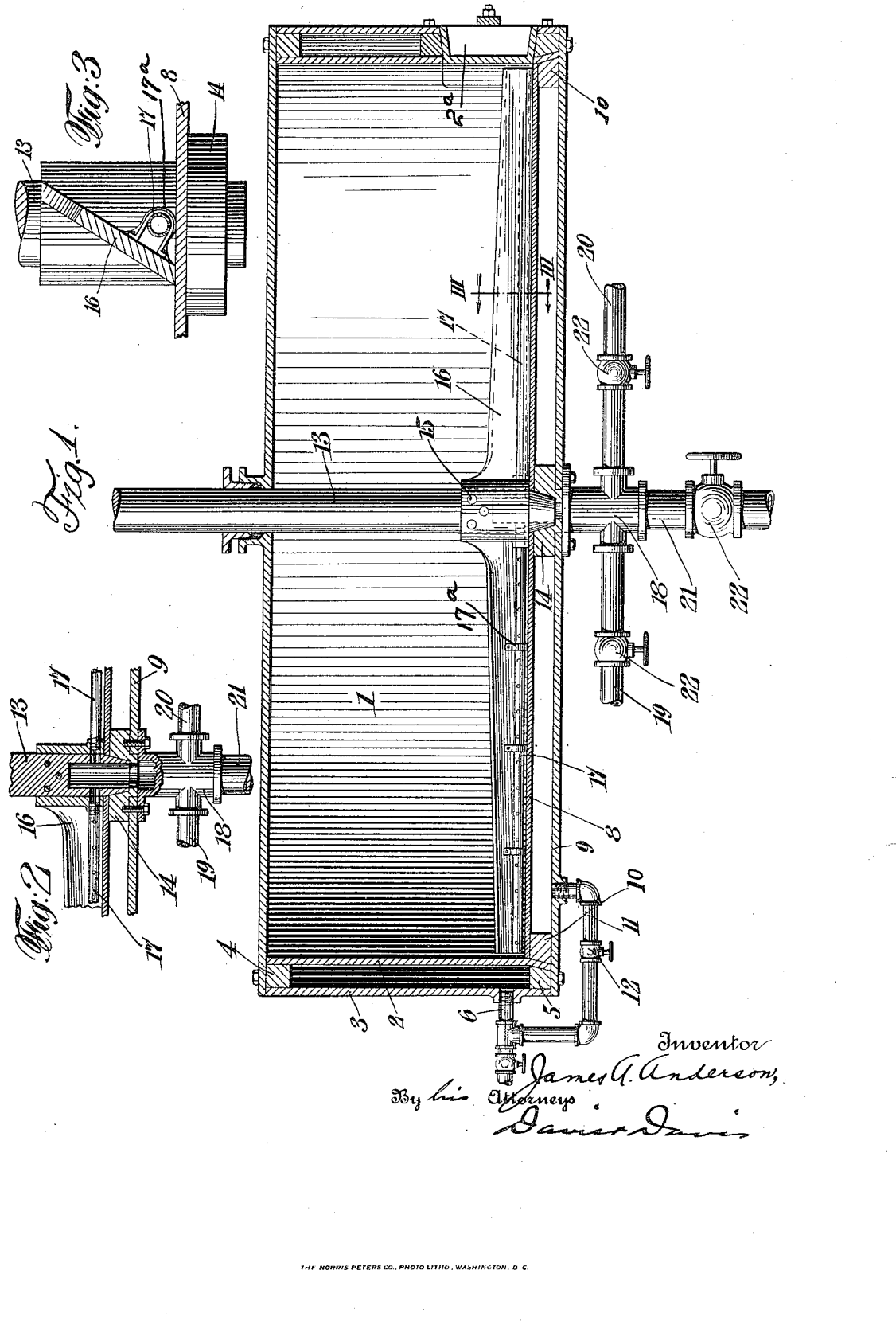
Inventor
James A. Anderson,
By his Attorneys

UNITED STATES PATENT OFFICE.

JAMES A. ANDERSON, OF BARREN ISLAND, NEW YORK.

TANK FOR TREATING GARBAGE.

1,214,113. Specification of Letters Patent. Patented Jan. 30, 1917.

Application filed March 8, 1916. Serial No. 82,807.

*To all whom it may concern:*

Be it known that I, JAMES A. ANDERSON, a citizen of the United States, and resident of Barren Island, county of Kings, city and State of New York, have invented certain new and useful Improvements in Tanks for Treating Garbage, of which the following is a specification.

In the treatment of garbage the material is placed in a double-wall tank during the cooking process. In these cooking tanks the material is agitated by a rotary stirrer, and this agitation and stirring brings considerable wear on the bottom of the tank. The heavy material in the garbage, and such foreign matter as broken crockery, glassware and metal parts, drop to the bottom of the tank and, during the stirring operation, grind out the bottom wall. This necessitates frequent repairing of the tank and, where the bottom wall is double, results in great expense and great delay. A suitable grease solvent is placed in these cooking tanks to dissolve the grease so that it may be recovered. Steam is also admitted into the tanks for the purpose of assisting in the process of recovering the grease.

One of the objects of this invention is to provide a double-wall bottom for the tank, which may be readily secured in position and which may be readily detached for the purposes of repair.

Another object of the invention is to provide means for introducing the steam and solvent into the mass of material at the bottom thereof and throughout the entire diameter of the tank, the distributing means being so arranged as to be protected by the stirrer blades.

It is also one of the objects of the invention to so construct the steam and solvent admitting and distributing means that it may be used as a discharging means.

Another object of the invention is to provide a double-wall tank with a complete, detachable, double-wall bottom, so constructed that extra bottoms may be held in reserve to be bolted in place whenever the one in use becomes damaged or worn and requires repairs. By this means the cooking tank need be out of use only during the time required to detach one complete bottom and to attach the new one.

In the drawing, Figure 1 is a vertical transverse sectional view of a garbage cooking or treating tank provided with my invention; Fig. 2 a detail vertical sectional view of the central part thereof, showing the bearing for the stirrer shaft; and Fig. 3 a transverse vertical sectional view through one of the stirrer blades.

Referring to the various parts by numerals, 1 designates the body of the tank, which is formed with the double side walls 2 and 3, said walls being connected at their upper and lower ends by the annular horizontal walls or rings 4 and 5. The tank is preferably cylindrical, but, of course, it may be of any desired shape. The space between the walls 2 and 3 is supplied with steam through pipe 6.

The bottom 7 of the tank is formed with the upper and lower walls 8 and 9, and with the annular side wall or ring 10. Steam is supplied to the space between the upper and lower walls of the bottom through a pipe 11. In pipe 11 is arranged a valve 12 by means of which the passage of steam to the bottom may be controlled. The inner wall 2 of the tank at its lower end inclines slightly outwardly and downwardly, and the annular side wall or ring 10 of the double bottom is correspondingly tapered to fit against said inclined wall. The lower wall 9 of the bottom is extended outwardly beyond the ring 10 to form a flange by means of which the bottom may be bolted to the lower end of the body of the tank, the attaching bolts passing through said flange and into the ring or bottom wall 5. Any suitable packing means may be used between the tapered wall of the double bottom and the correspondingly inclined wall of the body of the tank.

The lower end of a stirrer shaft 13 is seated in a bearing ring 14, said bearing ring being fitted between the upper and lower walls of the double bottom. On the shaft, near its lower end, is rigidly secured a hub 15 from which radiates two inclined stirrer blades 16, said blades extending across the space between the inner wall of the tank and the shaft, so that upon the rotation of the stirrer shaft the scraper blades will cover the entire bottom of the tank. These blades are inclined as shown in Fig. 3 of the drawing. The shaft 13 is hollow at its lower end, and connected to the said hollow portion are two radially arranged perforated pipes 17, said pipes being substantially equal in length to the stirrer blades. These pipes are arranged back of the stirrer blades so that as the stirrer is rotated the blades will protect said perforated pipes from the pressure of the material in the tank. By this arrangement the perforated pipes will, at all times, lie in a comparatively free space, and will be protected from the heavy material in the tank. These perforated pipes are arranged very close to the bottom of the tank for a purpose which will hereinafter appear. Connected to the interior of the hollow portion of the shaft 13 is a four-way pipe connection 18. To this connection are secured a solvent supply pipe 19; a steam supply pipe 20 and a discharge pipe 21, each of said pipes being provided with a suitable controlling valve 22.

The pipes 17 form screens, and their inner ends are screwed, or otherwise detachably secured, to the hub of the scraper. These screen pipes may be perforated in any desired manner in order that they will screen the solvent as it is pumped out of the tank. The screen pipes are supported in suitable straps 17ᵃ connected to the rear sides of the scraper blades. It will, of course, be understood, however, that they may be supported in any suitable manner. The tank is provided with a clean-out door 2ᵃ near the bottom thereof. Whenever it is desired to remove the screen pipes they are brought, one at a time, opposite the door 2ᵃ and then detached from the hub of the scraper. The said screen pipes may then be cleaned and replaced, or if desired new pipes may be inserted. It is very desirable to provide means whereby the screen pipes may be readily removed for cleaning purposes, for the reason that they are liable to become clogged by the grease and fats and other material.

It will, of course, be understood that suitable gages, both for temperature and pressure, will be attached to the tank, and also that the said tank will be provided with suitable doors for supplying material, and with a suitable exhaust to carry off the solvent vapors and steam.

In the operation of the tank a suitable quantity of solvent is placed therein together with the garbage or other material to be treated. Steam is admitted between the walls of the body part of the tank, and also between the walls of the bottom thereof. The stirrer shaft is operated and steam is passed through the perforated pipes 17 into the mass, in order to assist in freeing the grease from the contents of the tank. After the cooking operation has proceeded for the desired period, the valves controlling the steam inlet and the solvent inlet are closed, and the valve controlling the discharge pipe 21 is opened. The solvent and liquid contents of the tank are then pumped out and subjected to further treatment. The perforated pipes 17 serve both as inlet pipes and also as screened outlets for the solvent and liquid material. The solvent and steam are pumped into the tank as many times as may be desired, it being desirable that the stirrer be operated both during the time when the solvent and steam are being forced into the tank, and also when the liquid contents are being pumped out or permitted to flow from the tank. By this means the entire contents of the tank are repeatedly subjected to the action of the solvent and to the action of the steam, so that the entire mass will receive a uniform treatment and will be given a uniform temperature.

The body of the tank is a complete double-wall structure, and the space between its walls has no communication with the interior of the double-wall bottom. It will, of course, be readily understood that the space between the walls of the bottom may communicate with the space between the walls of the body part of the tank, if desired, but in order that the bottom may be detached from the body of the structure without freeing the steam surrounding the body part of the tank, it is preferred to form the two structures without any communication between the steam spaces. This facilitates repairs and prevents the cooling of the body of the tank whenever a new bottom is attached.

What I claim is:

1. A tank for the treatment of garbage comprising a tank, a stirrer shaft mounted therein, stirrer blades connected thereto, screen pipes carried by said shaft and extending outwardly along and back of the stirrer blades, means for supplying fluid to said screen pipes, and means permitting the contents of the tank to flow out through said screen pipes.

2. A tank for treating garbage comprising a tank, a stirrer shaft mounted therein, said shaft being hollow at its lower end, a stirrer blade connected to said shaft at the lower end thereof, a hollow screen pipe connected to the interior of said shaft and extending along and back of said stirrer blade, and means connected to the lower end of the shaft for supplying fluid to said screen pipe, and means permitting the contents of the tank to flow out through said pipe.

3. A tank for treating garbage comprising a tank, a stirrer shaft mounted therein, said shaft being hollow at its lower end, a stirrer blade connected to said shaft at the lower end thereof, a screen connected to the interior of the said shaft and extending along and back of said stirrer blade, means connected to the lower end of the shaft for supplying fluid to said screen, and means for permitting the liquid contents of the tank to flow out through said screen and through the bottom of the tank.

4. A tank for the treatment of garbage comprising a tank, a vertically arranged stirrer shaft therein, said shaft being hollow at its lower end, a pair of stirrer blades connected to said shaft at its lower end, a pair of hollow screens connected to and in communication with the interior of said shaft and extending outwardly at the back of the stirrer blades whereby they are protected by said blades, means connected to the lower end of said shaft for supplying steam and solvent to the screens, and means for permitting the liquid contents of the tank to be discharged through the screens and the hollow shaft.

5. A tank for treating garbage comprising a tank, a stirrer shaft mounted therein, a stirrer blade connected to said shaft, a detachable hollow screen pipe extending along the stirrer blade, means for supplying fluid to the tank through said screen pipe, and means for permitting the contents of the tank to flow out through said pipe.

6. A tank for treating garbage comprising a tank, a stirrer shaft mounted therein, a stirrer blade connected to said shaft, a detachable hollow screen extending along the stirrer blade at the back thereof, means for supplying fluid to the tank through said screen, and means for permitting the liquid contents of the tank to flow out through said screen.

7. A tank for treating garbage comprising a tank, a stirrer shaft mounted therein, a stirrer blade connected to said shaft, a hollow screen pipe extending along the stirrer blade, means for detachably connecting said screen pipe to said shaft, means for supplying fluid to the tank through said pipe and means for permitting the liquid contents of the tank to flow out through said screen pipe.

8. A tank for treating garbage comprising a tank, a stirrer shaft mounted therein, a stirrer blade connected to said shaft, a hollow screen pipe extending along the stirrer blade, means for detachably connecting said screen pipe to said shaft, means for supplying fluid to the tank through said screen pipe, and means for permitting the liquid contents of the tank to flow out through said screen pipe.

In testimony whereof I hereunto affix my signature.

JAMES A. ANDERSON.

Copies of this patent may be obtained for five cents each, by addressing the "Commissioner of Patents, Washington, D. C."